W. SHAKESPEARE, Jr. & S. G. RUSSELL.
FISHING REEL.
APPLICATION FILED JUNE 22, 1908.

959,623.

Patented May 31, 1910.

2 SHEETS—SHEET 1.

Witnesses
Lulu Grunfeld
Gertrude Tallman

Inventors
William Shakespeare Jr.
Samuel Guy Russell
By Chappell Lewis
Attorneys

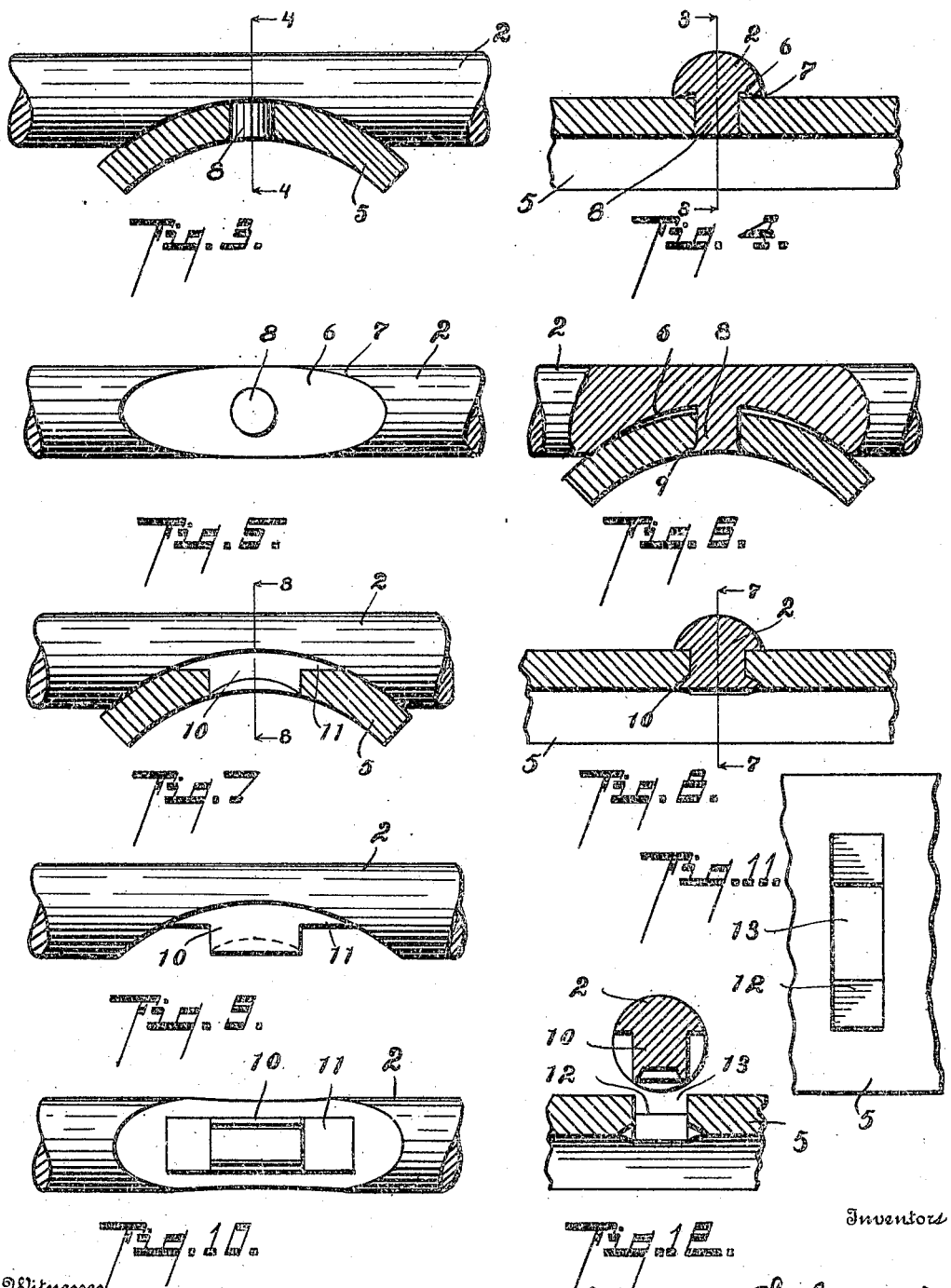

UNITED STATES PATENT OFFICE.

WILLIAM SHAKESPEARE, JR., AND SAMUEL GUY RUSSELL, OF KALAMAZOO, MICHIGAN, ASSIGNORS TO WILLIAM SHAKESPEARE, JR., COMPANY, OF KALAMAZOO, MICHIGAN.

FISHING-REEL.

959,623.   Specification of Letters Patent.   Patented May 31, 1910.

Application filed June 22, 1908. Serial No. 439,729.

*To all whom it may concern:*

Be it known that we, WILLIAM SHAKESPEARE, Jr., and SAMUEL GUY RUSSELL, citizens of the United States, residing in the city and county of Kalamazoo, State of Michigan, have invented certain new and useful Improvements in Fishing-Reels, of which the following is a specification.

This invention relates to improvements in fishing reels.

The main object of our invention is to provide in a fishing reel an improved base plate or reel seat plate.

Further objects, and objects relating to structural details, will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this specification, in which—

Figure 1:
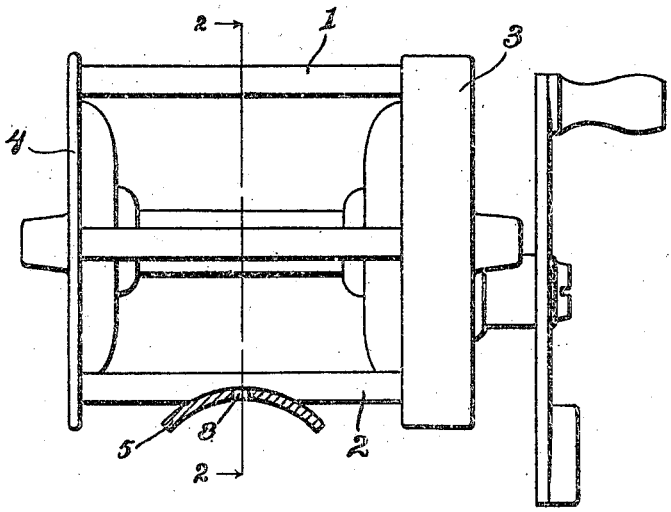
Figure 2:
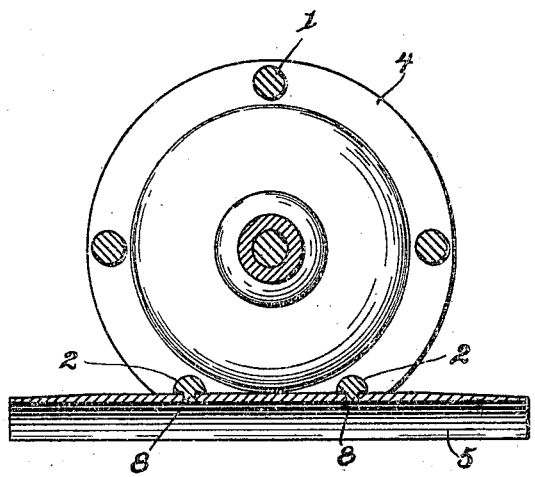

Figure 1 is a side elevation of a fishing reel embodying the features of our invention. Fig. 2 is a cross section thereof. Fig. 3 is an enlarged detail, the reel base plate being sectioned on a line corresponding to line 3—3 of Figs. 2 and 4. Fig. 4 is an enlarged detail section corresponding to the section of Fig. 2, the view being taken on the section line 4—4 of Fig. 3. Fig. 5 is an enlarged inverted plan of one of the base plate pillars. Fig. 6 is an enlarged detail section corresponding to Fig. 3, both the pillar and the base plate being sectioned. Fig. 7 is an enlarged detail section taken on a line corresponding to line 7—7 of Fig. 8, the pillar being shown in full lines, showing a modification in which a square rivet is provided for securing the base plate to the pillar and an engaging rib is provided on the pillar for the base plate. Fig. 8 is a longitudinal section through the base plate, taken on a line corresponding to line 8—8 of Fig. 7. Fig. 9 is a detail side elevation of the modified form of pillar shown in Figs. 7 and 8. Fig. 10 is an inverted detail plan thereof. Fig. 11 is a detail plan of the reel base plate slotted to receive the rivet of the pillar shown in Figs. 7 to 10, inclusive. Fig. 12 is a detail section showing the baseplate and the pillar before they are joined.

In the drawing, the sectional views are taken looking in the direction of the little arrows at the ends of the section lines, and similar numerals of reference refer to similar parts throughout the several views.

Referring to the drawing, the reel frame may be of the usual or any desired construction and ordinarily consists of pillars 1 and 2, the pillars 2 being the base plate or bottom pillars of the reel. These pillars join the head cap and tail plate 3 and 4, those illustrated being the common or well-known form. The reel base plate or reel seat plate 5 is preferably curved in cross section, as illustrated, and the pillars 2 are provided with seats 6 in their under sides which seats are curved longitudinally of the pillars to correspond to the curvature of the plate 5.

The seats 6 are preferably concaved in cross section, as clearly appears in Fig. 4, so that the reel base plate is engaged only at the outer edges 7 of the seats, thus making a very perfect fit,—that is, any slight irregularity, unevenness or projection on the plate does not prevent the engaging of the plate practically from end to end of the seat. The rivet 8 for securing the base plate to the pillars is located centrally of the seats 6 and is formed integrally with the pillars. This rivet is preferably formed on the pillars by the milling of the seats therein.

In the structure shown in Figs. 1 to 6, inclusive, the seats are milled in by the spherical milling tool having a central hole therein which forms the rivets as the seats are formed and also secures the concaving of the seats. This enables the rivets being formed very easily and rapidly. The reel base plates are preferably countersunk at 9, so that the rivets may be headed up and the inside of the base plate be perfectly smooth. By thus forming and connecting the parts, the base plate is secured to the pillars so that twisting movement thereof is prevented on account of its being arranged in the seat of the pillars. The base plate is not weakened by slotting to receive the pillar, as is the common practice, and the pillar is not injuriously weakened by forming the seat therein, as it is not necessary to further weaken the same by drilling to receive the rivet. A further advantage is that of economy in manufacturing; as, where the pillars are tapped to receive the rivets or screws, a number of operations are required, aside from the necessity for furnishing the separate screws or rivets.

In the modified construction shown in Figs. 7 and 12, the rivets 10 are square, the seats for the plates being formed in the pillars by milling tools having slots therein, the pillars being first longitudinally milled and then cross milled, which forms the rectangular rivet, as illustrated. When the rivet is thus formed, I preferably form the ribs 11 in the bottom of the seats, the ribs being formed longitudinally of the pillars to engage slots 12 formed in the under sides of the pillars and extending a short distance at each side of the rivet holes 13 thereof. These ribs, engaging the slots 12, relieve the rivet of a portion of the strain thereon and forms a very secure connection, and, when thus formed, the connection for the pillar and base plate is very secure. It however requires more accuracy in the forming and fitting of the parts, and we find the structure illustrated as the preferred form entirely practicable and it is somewhat simpler and cheaper.

By thus forming and arranging the parts, we secure not only a superior article, when completed, but one which results in an economy of labor and material in its production.

We have illustrated and described our invention in detail in the form preferred by us on account of the structural simplicity and economy. We are, however, aware that it is capable of considerable variation in structural details without departing from our invention, and we desire to be understood as claiming the same specifically, as illustrated, as well as broadly.

Having thus described our invention, what we claim as new and desire to secure by Letters Patent is:

1. In a fishing reel, the combination with a base plate curved in cross section, of a reel frame including a pair of base plate pillars having alined seats in their under sides, said seats being curved longitudinally of the pillars to correspond to the curvature of the base plate and being concaved in cross section, and rivets for securing said base plate to said pillars located centrally of said seats and formed integrally with the pillars.

2. In a fishing reel, the combination with a base plate curved in cross section, of a pillar having a seat in its under side said seat being curved longitudinally of the pillar to correspond to the curvature of the base plate and being concaved in cross section; and a rivet for securing said base plate to said pillar formed integrally with the pillar.

3. In a fishing reel, the combination with a base plate, of a pillar having a seat in its under side adapted to receive said base plate, said seat being concaved in cross section; and a rivet for securing said base plate to said pillar formed integrally with the pillar.

4. In a fishing reel, the combination with a base plate, of a pillar arranged transversely of said base plate and having an inwardly-curved seat in its under side adapted to receive said base plate; and a rivet for securing said base plate to said pillar formed integrally with the pillar and projecting centrally from said seat.

5. In a fishing reel, the combination with the base plate curved in cross section, of a pillar having a seat in its under side adapted to receive said base plate, said seat being concaved in cross section; and a rivet for securing said base plate to said pillar.

6. In a fishing reel, the combination with the base plate, of a pillar having a seat in its under side adapted to receive said base plate, said seat being curved in cross section; and a rivet for securing said base plate to said pillar.

In witness whereof, we have hereunto set our hands and seals in the presence of two witnesses.

WILLIAM SHAKESPEARE, JR. [L. S.]
SAMUEL GUY RUSSELL. [L. S.]

Witnesses:
LUELLA GREENFIELD,
PHINA WOODRUFF.